Sept. 20, 1966   L. M. MOYROUD ET AL   3,273,475
PHOTOGRAPHIC TYPE COMPOSITION DEVICE
Filed Nov. 6, 1963   10 Sheets-Sheet 3

INVENTORS:
Louis M. Moyroud
Higonnet

Sept. 20, 1966  L. M. MOYROUD ETAL  3,273,475
PHOTOGRAPHIC TYPE COMPOSITION DEVICE Filed Nov. 6, 1963  10 Sheets-Sheet 4

INVENTORS:
Louis M. Moyroud
Higinat

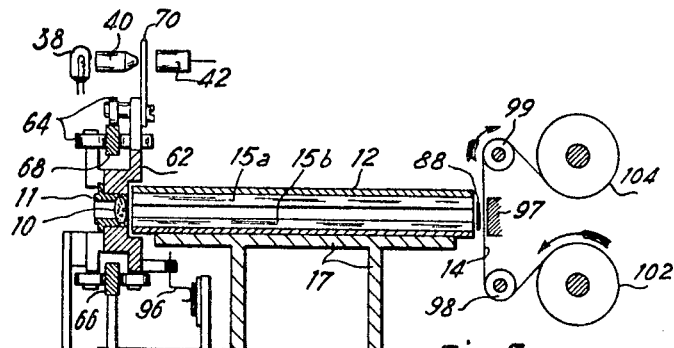
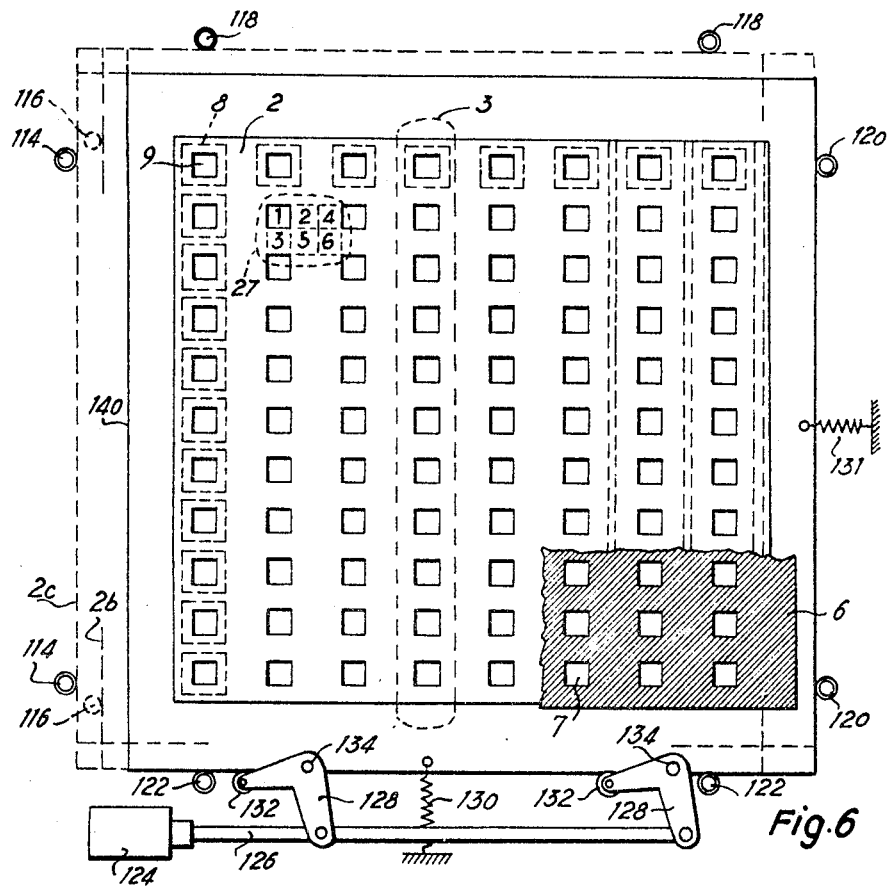

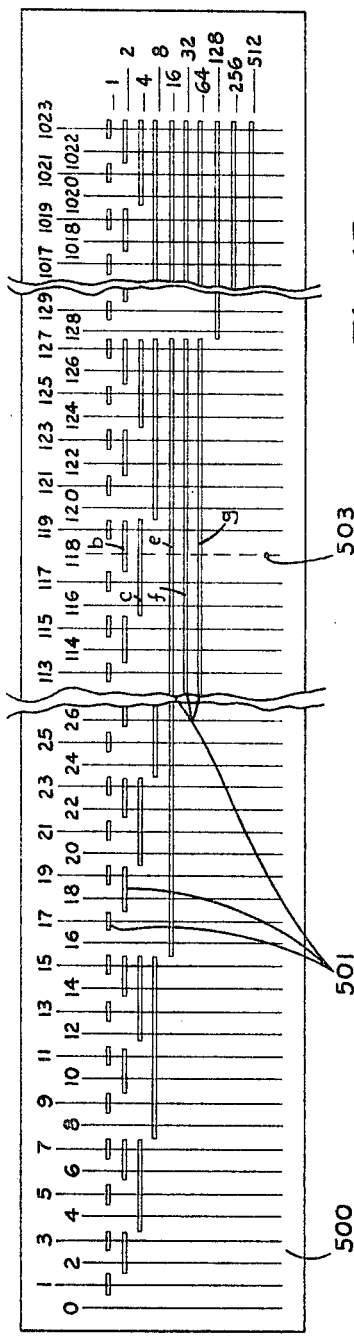

United States Patent Office 3,273,475
Patented Sept. 20, 1966

3,273,475
PHOTOGRAPHIC TYPE COMPOSITION DEVICE
Louis M. Moyroud, 50 Brooks St., Medford, Mass., and Rene A. Higonnet, 136 Brattle St., Cambridge, Mass.
Filed Nov. 6, 1963, Ser. No. 321,827
10 Claims. (Cl. 95—4.5)

This application is a continuation-in-part of copending application Serial No. 120,313 filed June 28, 1961 now Pat. No. 3,188,929, and Serial No. 627,501 filed December 10, 1956 now Pat. No. 3,117,502, which was a continuation-in-part of copending application Serial No. 332,312 filed January 21, 1953, now abandoned and Serial No. 224,160 filed September 17, 1962, now Patent No. 3,228,313.

This invention relates to high speed, high quality photographic type composition.

It is an object of the present invention to provide means to project at a predetermined point the image of any preselected character from a stationary matrix.

Another object of the invention is to provide a photographic type setting apparatus producing a line of characters to reach sweep of a continuously reciprocating component of said apparatus.

Another object of the invention is to provide a high speed photographic type composing apparatus including means to vary the type face and/or point size of projected characters between consecutive sweeps and means to compose a single line including characters of different fonts by a series of sweeps.

A further object of this invention is to provide an apparatus to merge a number of character-image carrying light beams into one.

Another object of this invention is to provide an image formation unit for cathode ray tube printing systems.

Other objects and advantages of this invention will be apparent from the following description, the accompanying drawings and the appended claims.

In the accompanying drawings, forming a part of this application, and in which like numerals are employed to designate like parts through the same:

FIG. 5 is a cross-section through the optical components of the image director section of the novel photographic type composing apparatus.

FIG. 6 is a diagrammatic view of the character matrix used in the embodiments of the invention.

FIG. 12 represents schematically a line with words of different type face and/or point size.

FIG. 13 is a diagrammatic representation of the line-break control section of the apparatus.

FIG. 15 represents a grid used to measure the displacement of the lens carriage.

Figure 1:
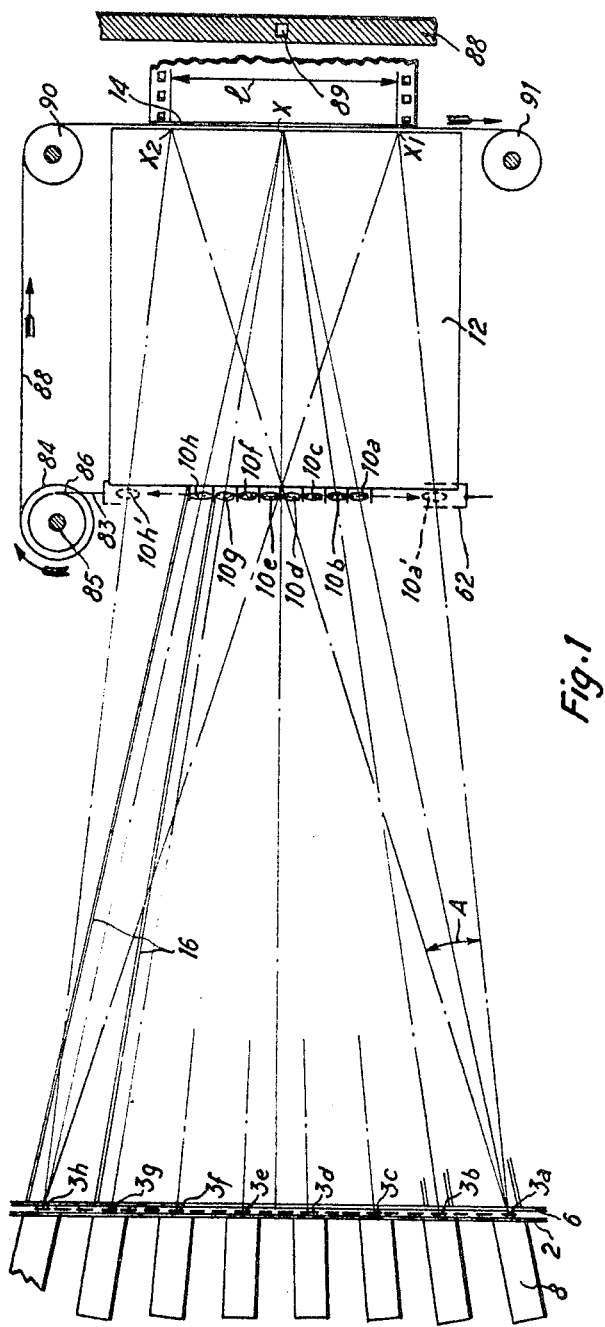
FIG. 1 is a diagrammatic top plan view of the image director provided by the invention in which the most important components only are shown.
Figure 3:
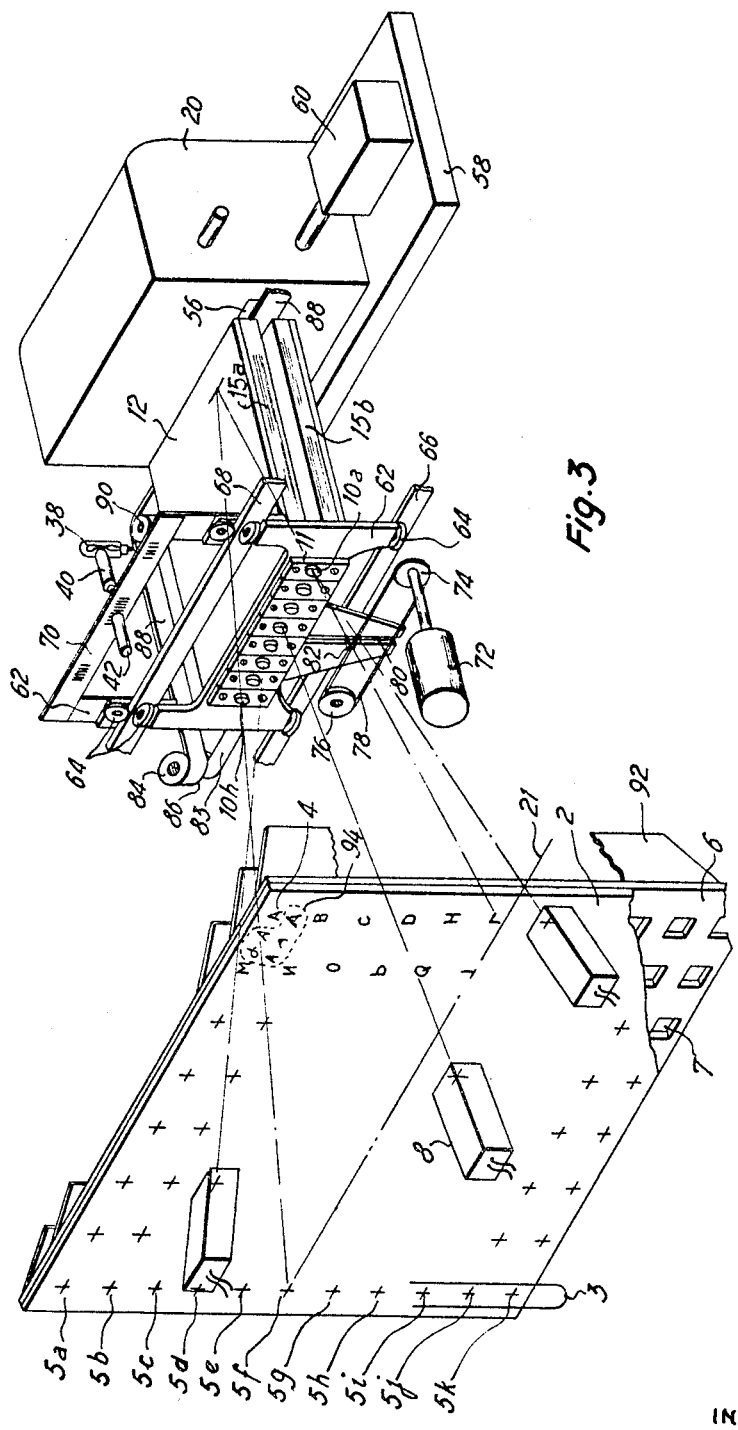
FIG. 3 is a simplified isometric view of another embodiment of the present invention.

In the embodiment shown in FIG. 1, the master characters, transparent on an opaque background, are located on a matrix 2. This matrix can be made up of a number of easily interchangeable photographic glass blocks, plates or strips and the master characters can be obtained by photographic means. The characters are arranged in rows and columns as shown in FIGS. 3 and 6. In the embodiment shown, there are, on matrix plate 2, eight vertical columns of characters such as 3. These columns are shown at 3a to 3h in FIG. 1. There are eleven characters in each column shown at 5a to 5k in FIG. 3. Thus, in the example shown, the matrix includes 8 times 11 or 88 master characters. There is one flash unit 8 associated with each of these master characters. Each flash unit can deliver flashes of very short duration and thus project the associated master character to a light-sensitive surface such as a film, as will be explained later. The light bundle emerging from each master character is limited by a stationary plate 6 provided with apertures slightly larger than each character (FIGS. 1, 3 and 6) and is confined by baffles 16 (FIG. 1). The length of these baffles varies according to the embodiment of the invention and they may be replaced by other means as will be explained later.

Any character illuminated by a flash is projected onto a light sensitive surface 14, at a point X. Eight lenses shown at 10a to 10h, one per column, are positioned between the matrix and the light sensitive surface at the proper position to project sharp images. In the example shown, the lenses are position at a distance from the light sensitive surface approximately one-third the distance between said surface and the matrix so that the object image/ratio is two; in other words, the projected character images are one-half the size of the master characters of the matrix.

The optical axes of lens 10 are contained in the "median plane" defined by the central row 21 (FIG. 3) of master characters and the axis of aperture 56 of the film magazine. As shown in FIG. 1, each lens is positioned so that it makes an image of its associated character column at X. In the example shown, the lenses would be spaced from each other by one-third the distance between the center of consecutive columns of the matrix. It is thus clear that the lens assembly produces a first optical merger, reducing the number of projected columns of characters to one.

Figure 2:
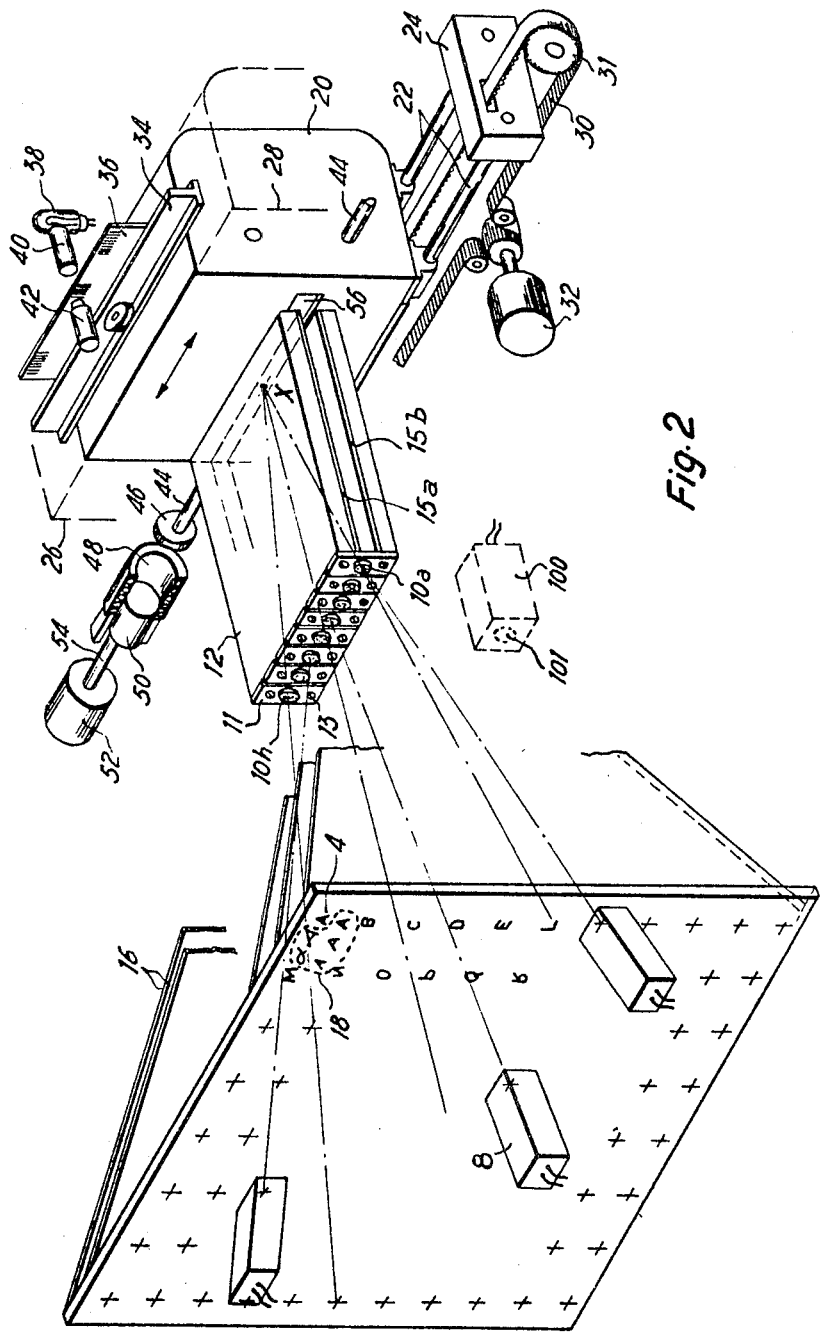
FIG. 2 is a simplified isometric view of one embodiment of the invention.

The second optical merger is obtained by placing, between lens assembly 10 and film 14, a reflecting block 12. This block, as shown in FIG. 3 includes a pair of reflecting surfaces 15a and 15b. These surfaces are positioned so that they are parallel with, and equidistant from, the median plane as defined above. The distance between the reflecting surfaces is determined by the distance between two consecutive characters of the same column opposite a flash unit and the reduction ratio—as explained in our co-pending application. The reflecting surfaces, through multiple reflections, cause the light bundle originating from any character of a given column and emerging from the lens associated with said column to form an image at the same location. Of course, these reflecting surfaces have no effect on any of the characters located on the median line 21, such as 5f. They cause characters of rows 5e and 5g to be projected to point X after one reflection; characters of rows 5d and 5h after two reflections etc. In order to obtain erected characters at location X, the master characters of each row of the matrix are alternatively erect and upside down as shown in FIGS. 2 and 3. The reflecting surfaces are preferably protected by a front and rear thin optical glass window not shown.

A certain amount of light loss is incurred at each reflection and compensating means are provided to relatively increase the light output of flash units 8 in proportion to the number of reflections to which their associated characters are submitted. The light reaching film 14 can also be equalized by the use of filters. The light loss could be reduced by the use of a solid glass slab rather than reflecting surfaces such as mirrors. However this practice would require special lenses whereas commercially available lenses are appropriate for use in combination with front surface mirrors.

As shown in FIG. 1, the portion of film 14 on which images are formed in positioned at the emerging side of reflecting block 12. This film, as shown in FIG. 5 is moved up from a supply spool 102, over roller 98, over presser 97, to roller 99 and finally to take up spool 104. These spools are enclosed in a light-tight magazine shown at 20 in FIGS. 2 and 3. A leading or line spacing mechanism 60 (FIG. 3) is provided to feed the film the appropriate amount between the projection of consecutive lines.

Figure 9:
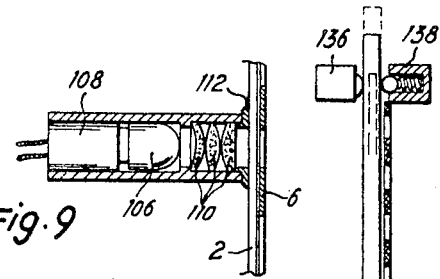
FIG. 9 is a cross-section of one of the flash units utilized in the present invention.

In the first embodiment of the invention, shown in FIG. 2, the identical projection lenses 10a to 10h are stationary. They are mounted in individually adjustable lens holders 11 secured by screws 13 to reflecting unit 12. Each lens holder is individually adjusted so that each lens makes an image of its associated character, located in the median plane as defined above, at the common projection point X. Mirrors 10 and 15 are properly spaced and positioned relative to the lens assembly so that any character of a given column of the matrix is also projected at the common point X. Each flash unit assembly 8 is oriented so that the optical axis of the optical condenser 110 it includes (see FIG. 9) intersects the associated projection lens at approximately its center.

Each condenser 110 of a flash unit 8 is axially positioned to form an image of the associated flash lamp 106 in the associated projection lens 10. As shown in FIGS. 1 and 2, baffles 16 are provided to prevent light emerging from any character of a given column from reaching any other lens but the one associated with said column. To further confine the light to the desired area, an aperture plate similar to the one shown at 6 in FIG. 3 is positioned adjacent to the matrix. This plate has as many square apertures 7 as there are flash lamps. Each aperture is just large enough to accommodate the largest character of the matrix to which it is associated.

In addition to the 88 characters in operative position, matrix 2 can have additional characters shown at 94 which can be selectively brought into operative position by matrix shifts as will be explained later in relation with FIG. 6

By flashing a given flash unit 8, the associated character of the stationary matrix is projected through one of the apertures of plate 6, through the associated stationary lens 10 and the stationary reflecting block 12 to the film of magazine 20. This magazine, in the embodiment of FIG. 2, is continuously reciprocating along fixed rails 22 attached to block 24 through a mechanism comprising a belt 30, pulley 31 and a motor 32. The alternative motion can be obtained by clamping belt 30 to the magazine and alternatively running the motor in one direction and the other, or the mechanism shown in FIG. 4 can be used. In this mechanism, a drive belt 78, driven by a continuously rotating pulley 74 forms a loop between said pulley and idler 76. A drive finger 82 is attached to the belt to communicate an alternative motion to the driven unit which, in the case of FIG. 2 is magazine 20.

As the driving mechanism operates, said magazine continuously travels between extreme position 26 shown in dotted line, through medium position shown in solid lines, to the other extreme position 28 shown in dotted lines and vice versa. The displacement of the magazine is utilized to properly space the characters of a line. For high quality output, proportional spacing of characters of varying widths in preferably used. The width of each character of the matrix can be expressed as an integral number of a basic width unit. In the embodiments described in this application the basic width unit for elementary width unit, further referred to as E.W.U., or Unit, has been chosen in conformity with good typographical practice to be equal to one eighteenth of one typographical point. One E.W.U. is very close to two hundredths of a millimeter and this value will be used in the following description as a basic unit. The flash lamp located at the back of the character to be projected is triggered at the exact moment when said character image is in the proper position in the line being composed. The flash control circuit which will be described later is timed by pulses produced by the displacement of magazine 20. One pulse is produced each time said magazine travels one E.W.U. These pulses are generated by an arrangement comprising an exciter lamp 38, and an optical system 40 attached to the frame of the apparatus, a grid 30 attached to the reciprocating magazine, and a fixed photocell 42. The optical system 40 projects a narrow luminous slit on grid 30 which is generally opaque except for transparent narrow slits spaced by one E.W.U. In order to simplify the manufacture of grid 30, the slits can be spaced by 10 E.W.U. In this case, a special circuit (frequency multiplier or timed pulse generator) must be used in order to generate 10 properly spaced pulses for each photocell pulse.

In order to feed the film for line spacing or leading, the magazine is provided with film feed rollers driven by shaft 44. This shaft protrudes on both sides of the magazine, as shown. Each side is provided with a disc 46 forming the first part of a magnetic clutch 50 including a coil 48 and a second part attached to drive shaft 54 of leading mechanism 52. As shown in the figure, at the end of each stroke, disc 46 (or the identical disc located at the other end of shaft 44) comes into contact with disc 50. At this time, the leading mechanism is activated to space consecutive lines by the desired amount. For better operation disc 50 is slidably mounted on drive shaft 54 and is urged to an extreme forward position by a spring (not shown) so that contact between discs 46 and 50 is established before the end of the stroke of film carriage 20, disc 50 being pushed toward the leading unit against the action of its spring at the same time as the leading occurs. This system constitutes also a dash pot effective at each end of sweep.

The embodiment shown in FIGS. 3, 4 and 5 will now be described.

The major difference between this embodiment and the one shown in FIG. 2 is that the film magazine is stationary and the lens assembly 10a–10h is mounted on a continuously reciprocating carriage 62.

One of the advantages of the first embodiment is its greater luminous output as each flash condenser directs its bundle of light to an area restricted to one lens only. One of the advantages of the second embodiment lies in the fact that the lens carriage can be relatively light thus enabling the machine to attain higher composing speeds.

In this second embodiment the matrix 2 is the same as in the case of FIG. 2. The flashing units 8 are also located as in the previous case, but the optical condenser of each unit is especially designed and located in relation to the associated flash lamp to illuminate, in the plane of the lens carriage an area sufficiently long to cover the path of the associated lens. For example, in FIG. 1, flash unit 8 preferably produces a flat bundle of rays of a width determined by the angle A embracing the two extreme positions of lens 10a and of a thickness determined by the diameter of said lens 10a. In this second embodiment the baffles 16 are reduced to short sections 92 (FIG. 3) so as not to interfere with the wide bundles of light produced by each flash unit. FIG. 1 shows in dotted lines the extreme outside position of extreme lenses 10a and 10h at 10' and 10h' respectively. The lens carriage is also shown in more details in FIGS. 3, 4 and 5. It includes a frame 62 provided with rollers 64 which enable said carriage to slide along rails 68 and 66. Lenses 10 are mounted in adjustable lens holders 11 so that each carriage can be optically aligned by slightly moving each lens in the proper direction to achieve optical column merging. The lenses 10a–10h are of substantially the same focal length. Carriage 62 is provided with brushes such as 96 establishing appropriate contacts to signal to the control circuits the end or the beginning of a reciprocating motion. Said carriage is also provided with a grid 70 similar to the one described above, cooperating with exciter lamp 38, optical unit 40 and photocell 42. As shown in FIG. 5, the carriage reciprocates in a path adjacent to reflecting block 12 composed of a frame 17 and mirrors 15 and 16.

Figure 4:
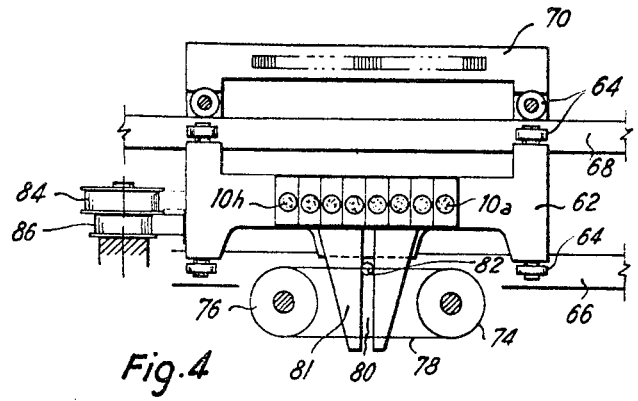
FIG. 4 represents the lens carriage used in the second embodiment of the invention.

Carriage 62, as shown in FIG. 4, is continuously reciprocated by the system previously described. The driving finger 82 attached to belt or chain 78 engages a slot 80 provided in the extension 81 of said carriage.

In order to confine the light striking the film to one character only and avoid the projection of parasitic images formed by the lenses adjacent to the one called for by a particular character, the following arrangement is used. A shutter blade 88, in the form of a flexible steel band provided with an aperture 89, large enough to accommodate the largest character image, is located between the emergency side of reflecting block 12 and film 14. This strip is continuously reciprocated in synchronism with the carriage 62 by the arrangement shown in FIG. 1 where, as pointed out previously, it is assumed that the reduction ratio is two (image is one half the size of the master character). Carriage 62 drives a spring loaded drum 86 around pivot 85 (FIG. 1) through band 83. Another drum 84 is attached to drum 86 so that it rotates with it. Shutter band 88 is attached to drum 84 at one end, runs around idler 90, as shown, and is attached to spring loaded drum 91 at the other end. The spring enclosed in drum 91 maintains shutter band 88 under constant tension and takes up any slack by winding said band around drum 91 (FIG. 1). As carriage 62 moves down, as shown in FIG. 1, (so that lens 10a moves towards position 10a'), band 83 is pulled down and drum 86 and 84 rotate in the direction of the arrow, thus releasing band 88 from drum 84. Thus shutter band 88 moves down, as shown by the arrows in the same direction as carriage 62. The respective diameters of drums 85 and 84 are such that the aperture 89 of band 88 moves at substantially the same speed as the projected images.

In the example shown, the diameter of drum 86 is two-thirds the diameter of drum 84 so that shutter band 88 moves three E.W.U. when the lens carriage moves two E.W.U. It is evident from the description which precedes that the common projection point X at which all character images are merged moves across film 14 in synchronism with the lens carriage. The aperture 89 of shutter band 88 is, at all times, located on this reciprocating point X so that the only character image which is allowed to reach the film is the one formed in said aperture. The maximum length of line is determined by the total longitudinal displacement of carriage 62. In the example shown in FIG. 1, when lens 10a is moved from its extreme position 10a' to its opposite extreme position, point X moves in synchronism from position $X_1$ to position $X_2$. It will be appreciated by examining the figure that the ratios of displacement or speed of point X (character image) to the displacement or speed of the lens carriage 62 depends on the optical reduction ratio. As this reduction is two in the example of the figure, the character image or point X moves three units for each two-unit displacement of the lens carriage. Consequently, maximum travel of the lens carriage is two-thirds the maximum length of line "L." As shown in FIG. 3, the film carriage, stationary in this second embodiment is attached to the apparatus base 58 to which leading unit 60 is also secured.

In this second embodiment, the pulse generating grid 70 attached to carriage 62 is provided with slits spaced in proportion to the E.W.U. and also to the optical reduction ratio so that a pulse is generated each time the image (point X) moves by one E.W.U. or a multiple of this unit if proper pulse multiplying means are used.

All embodiments of the present invention preferably include one or several flash checking units such as the one shown at 100 in FIG. 2. These units include a wide angle lens 101 and a photocell. Their purpose is to detect the presence or absence of flashes. Their output is compared with the output of the flash command circuit in order to give an alarm in the case where a flash command is not obeyed and also in the case where a flash occurs independently of a command.

It has been assumed, so far, that the matrix plate contains no more than one character per flashing unit, or 88 characters in the example shown. It is however highly desirable, in typographical work, to be able to have more than 88 characters available at all times. As such a group of characters represent the capacity of most typewriters it can be considered as representing one font. The basic font can be a "Roman" type face of a given point size. The method described below makes it possible to mix even in the same line characters of different faces such as Roman, Italic, Bold, etc. and different point sizes, from five to fourteen points in present embodiments. Referring now to FIG. 6, the matrix 2 is shown together with fixed aperture plate 6. Each aperture 7 of said plate is large enough to accommodate any twenty eight point characters, if this is the maximum size of master characters. Flash units are represented by large squares in dotted lines such as 8. The smaller squares in solid lines concentric with squares 8 on matrix 2 represent the areas allocated to the 88 characters in projection position, that is located on the axis of flash units. Such an area is represented by square 1. There are additional character areas attached to each square 1, as shown at 2, 3, 4, 5 and 6 within each group 27.

For example, locations 1 may contain 20-point Roman characters, producing 10-point Roman on the film. Locations 2 may contain 24-point Italics to produce 12-point Italics on the film. Locations 3 may contain a 28-point Bold Face to produce 14-point Bold on the film, locations 4 may contain Greek Characters, locations 5 small caps, etc. In order to shift the matrix from a location or area "one" to another area, the matrix is mounted in a frame which can be moved in its plane, along the horizontal and vertical axis as explained in our co-pending application S.N. 224,160 filed Sept. 17, 1962. The matrix motions are confined within a vertical plane by the arrangement of FIG. 7. Matrix frame 140 is maintained against bearing blocks 136 by the action of spring loaded ball units 138. When the matrix is in the "one" position, it is sitting on stops 120 and 122 as shown in FIG. 6. In order to shift the matrix from position "one" to position "three" a solenoid 124 is energized which, through pull rod 126, bell cranks 128 pivoted at 134 on the machine frame and rollers 132, pushes matrix frame 140 upon against stops 118 against the action of spring 130.

A similar mechanism is used to move the matrix frame horizontally (as shown in the figure) against spring 131. A pair of solenoid-energized stops 116 limits the horizontal displacement of the matrix to position 26 in order to bring areas "two" or "five" in operative positions. The other positions "four" or "six" are reached by moving the matrix all the way against stops 114. In every case, the incremental displacement of the matrix is exactly what is required to replace one character area by another character area, opposite fixed aperture plate 6.

Figures 7, 8:
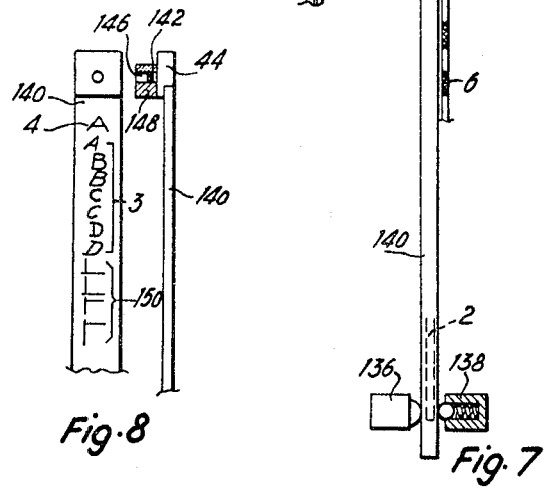
FIG. 7 is a cross-section of the character matrix.
FIG. 8 represents a removable matrix strip.

In a preferred arrangement, the matrix is not made of one single glass plate but rather of a number of interchangeable sticks as shown in FIG. 8. Each stick is composed of a glass strip 140 cemented or clamped at both ends to stainless steel blocks 144, provided with locating pins 122 engaging holes 146 provided in matrix frame 140 so that they can be accurately positioned and easily changed. Each glass strip may have one or more "empty" character locations 150 where locating reference lines only appear. This arrangement makes it possible to introduce new or seldom used characters in the form of a negative piece of film also provided with reference lines.

Each individual piece of film is accurately located by matching reference lines, and secured to the strip by adhesive.

Figure 10:
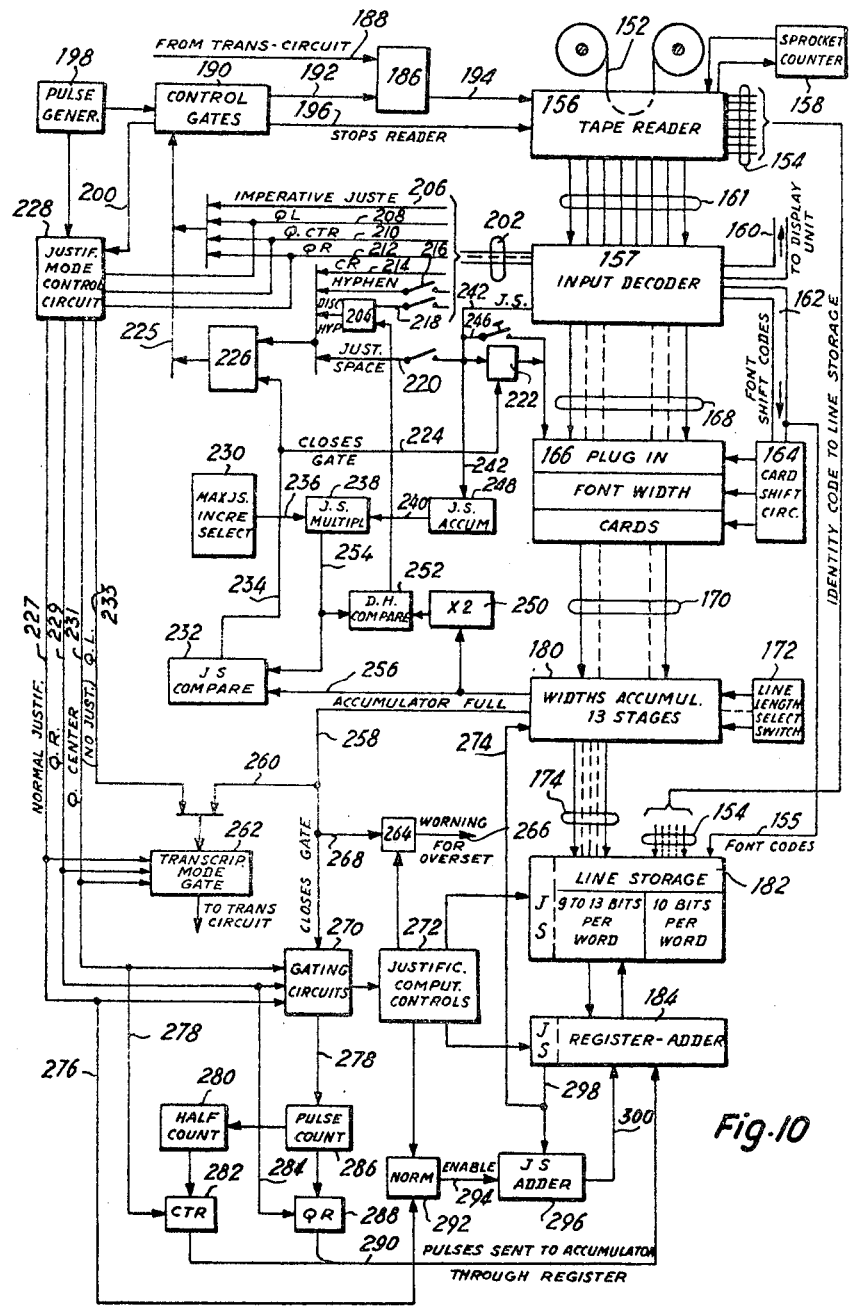
FIG. 10 is a block diagram of the loading and justifying section of the computer.
Figure 11:
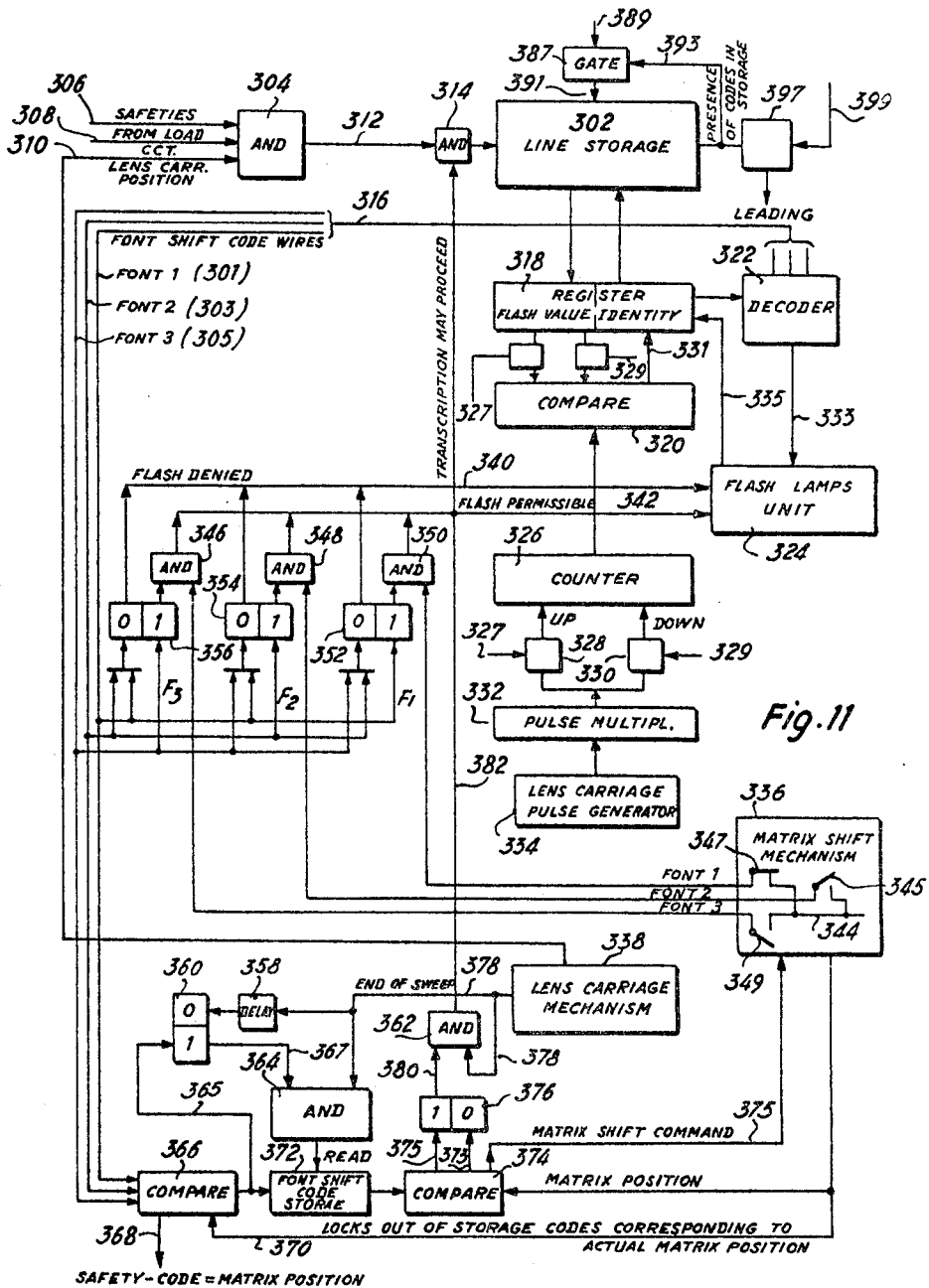
FIG. 11 is a block diagram of the transcription section of the computer.

The photographic type composing apparatus embodying the present invention can be operated by punched cards or a magnetic or perforated tape. In the latter case, the tape can be punched on any tape punching keyboard, as it is not necessary according to one feature of the present invention, to terminate each line at the point which will be the right hand margin in the finish product, as will be explained later. The perforating keyboard can be provided with auxiliary shift keys in addition to the conventional character keys and "cap" shift keys and also with quadding and other function keys. There can be for example 6 shift keys corresponding to the 6 possible positions of the matrix. The keyboard operator presses the key corresponding to the type font desired before typing the text which is to appear in said font. The control circuits of the type composing machine are schematically shown in the block diagrams of FIGS. 10 and 11. FIG. 10 represents the loading and justifying circuit of the machine and FIG. 11 represents the transcription circuit.

Referring to FIG. 10, the perforated tape 152 is introduced into the high speed tape reader 156. In a preferred mode of operation, tape 152 is an eight-level tape in which seven levels or bits are used for character identity. The eighth bit, in combination with other bits may be used for matrix shifts, quadding and other functions. The tape is read at the rate of 800 characters per second for example. As each code is read, it is transferred to storage 182 via wires 154. At the same time the same code is fed to a decoder 157 via wires 161 which detects special codes such as justifying space codes, thereafter called J.S., font shifts, etc. and identifies each character for proportional spacing purposes. Thus, for an 88-character font, there are 88 wires emerging from decoder 157 included in bundle 168, representing different characters. There wires are fed to a font widths cards unit 166 similar to the card units described in our co-pending application, S.N. 741,209, filed June 9, 1958.

Electronic means rather than mechanical means are utilized to switch the 88 character wires from one width card to another at the command of a font shift code appearing on wires 162. This electronic switching can be performed by magnetic cores. The different font shift wires emerging from card shift circuit 164 are used to inhibit one group of cores or another depending on the font last selected. As the whole width selecting system operates as described in said co-pending application, it will not be described in detail. Eight "binary width" wires 170 emerge from the width cards system. The value of these wires, in E.W.U. is 1, 2, 4, 8, 16, 32, 64 and 128. They enter a binary accumulator 180. Said binary accumulator is pre-set by line length selection switches 172 at a value equal to the difference between its total capacity and the length of line desired, in E.W.U.

As each character of a line is read by the tape reader, its width is added to the widths of the preceding characters of the line into said accumulator 180 which represents at all times the total amount of space in units required by the line being read plus the pre-set amount. Accumulator 180 is preferably composed of two sections. The first section keeps a constant account of the accumulated widths of the characters only. The second section represents this accumulated width plus the pre-set value. The latter operation can also be performed by an adder, outside the accumulator unit. For each character entry, the accumulated widths representing the width of said character plus the widths of preceding characters is transferred via wires 174 to storage 182. This accumulated width, attached to each character identity code from this point on, is referred to from now on as unjustified flash value. It is stored in storage 182 on the same "word bits" as the identity of said last entered character. Justifying spaces are stored in a special section of said storage shown at J.S. The minimum justifying space width can, at this point, be added to the accumulator, so that the unjustified flash value of characters following the first justifying space is increased by one or several times this minimum value. Means are provided to stop reading tape 152 either at a special command code of said tape such as carriage return (CR), imperative justification (I.J.), quad left (Q.L.), Quad center (CTR) Quad right (Q.R.) or Hyphen (Hy). Codes CR will be present in a tape where the text to compose has already been divided into lines at the keyboard. In the case where this is not so, the circuit will look for a possible insertion of hyphen (if the discretionary hyphen system as described is Patent 2,968,383, and our co-pending application S.N. 120,313, filed June 28, 1961 is used) or the presence of an interword space. If none of these appear before the accumulator reaches full capacity, an alarm is sent over wire 266 to stop the loading operation and notify the operator who will proceed as it will be explained later.

In order to obtain excellent typographical quality in justified lines, the maximum increment (in E.W.U. or multiples of same) is selected by the operator taking into account among other things, the point size of the base font to be used for a given composition. This selection is made by actuating maximum justifying space increment selection switches 230. The value represented by these switches is sent through wires 236 to multiplier 238 which receives through wires 240, from accumulator 248 the total number of justifying spaces in the line being loaded, said spaces emerging from decoder 157 on wire 242 connected to J.S. accumulator 248. Each J.S. is also transferred, through gate 222 to the font width cards to receive a minimum value proportional to the set or size of the font selected as mentioned above. Multiplier 238 is connected via wires 254 to comparison circuit 232 which also receives from wires 256 the deficit of accumulator 180. As soon as this deficit is equal or inferior to the number of J.S. times maximum allowable increment as stored in multiplier 238, a "justification possible" signal is sent via wires 234 to wire 224 to close gate 222 to prevent any new entry of J.S. into the storage. The same signal carried by wire 234 opens gate 226.

When this gate is open any of the following signals will stop the loading operation: C.R. from wire 214; Hyphen from wire 216; and J.S. from wire 220. The accumulator deficit is multiplied by a factor of two in a doubling circuit 250 connected to comparison circuit 252 so that a signal is generated by said comparison circuit when the deficit of the accumulator has been reduced to one half the original J.P. value. This value, called discretionary hyphen justification zone being inferior to the J.P. value, precedence is given to J.S. codes to terminate a line over discretionary hyphen codes. Comparison circuit 252, when the discretionary hyphen zone is reached, opens gate 204 via wire 221 so that, if loading proceeds, the line will now be stopped at any of the codes previously mentioned plus any discretionary hyphen code. As soon as any of these line termination codes appear, a pulse is sent via wire 225 to gate 190 to stop the tape reader via wire 196 and energize the justification mode control circuits 228 via wire 200. A pulse generator 198 is utilized to perform the loading and justifying operations. The normal justification computation, initiated by the energization of wires 227–276 and gates 270, 292 and controlled by circuits contained in box 272 but not shown in detail, is done as follows: each character code and its unjustified flash value which has been put into storage 182 during the loading mode is sequentially read out, stored in register adder 184 and updated. The unjustified flash value of each character is read out and stored back into storage 182 until the first justifying space appears in adder 296. After this space, each subsequent flash value is increased by one, through wire 300 until a new J.S. appears on wire 298. The flash values of the following characters are now increased by two (value in adder 296), and so on. In addition, each time a J.S. is read out of storage the accumulated width shown in accumulator 180 is increased by one via wire 274. If, after processing all the characters of the line said accumulator 180 has not yet reached full capacity, the scanning and updating process of all flash values is repeated again. If, in the middle of an updating process a particular J.S. causes the accumulator 180 to reach full capacity, a pulse appears on wire 258 to terminate the process and the rest of the characters are up-dated with the number of increments present and further J.S. are ignored until the justifying mode terminates with the completion of this last storage scan. The storage 182 now contains a justified flash value associated with each character. The energization of wire 258 causes also the energization of wire 260 which opens the transcription mode gate 262 so that the transcription can start at the appropriate point of the travel of the reciprocating film or lens carriage. In the case of a Quad Left (No justification) line, the whole justification process is by-passed through the energization of wire 233 which directly opens transcription gate 262. In the case of a Quad right line, pulses are sent via circuit 270, wire 278, counter 286, gate 288 and wire 290 to the justification controls circuits and the storage register-adder loop until all the unjustified flash values of the characters have been increased by a number of units equal to the number of pulses required to fill width accumulator 180. For Quad centered lines, the same process is followed except that, for two pulses sent to the accumulator only one is added to the flash value of all the characters.

The transcription operation will now be described in relation with FIGS. 11 and 12. In FIG. 11, line storage 302 also can be storage 182 of FIG. 10, but, in order to increase the speed of the system and permit overlapping operation of the loading and transcription functions, it is preferable to transfer the contents of line storage 182 of FIG. 10 to line storage 302 of similar construction and capacity. The transcription operation is initiated by the opening of a first gate 304 which remains closed until the loading-justifying operation is performed (wire 308) and the lens carriage is at the proper position (wire 310) at the end of a sweep or stroke to start an active displacement. An additional wire 306 is also connected to gate 304 to prevent transcription unless certain operations such as leading have been performed. The opening of gate 304 causes energization of wire 312 which sends a pulse through gate 314, opened when the matrix is in the proper position, to start the reading operation of storage 302. Each character code and its flash value is sequentially read and transferred to register 318 and decoder 322. The reciprocating carriage generates one pulse for each E.W.U. displacement of character images as explained above. The carriage pulse generator is shown at 334 and the optional pulse multiplier at 332. Each pulse coming out of circuit 332 is added to (through gate 328) or subtracted from (through gate 330) a counter 326. The pulses or E.M.U. accumulated by this counter represent at each moment the actual position of the reciprocating carriage from an origin. For example, when the carriage moves from left to right (as seen from the matrix side) the counter counts up from zero to a maximum of, for example, 6,000 pulses and when the carriage returns, moving from right to left, the same counter will count down from 6,000 to zero.

The selection of "up" or "down" count, as well as the starting of pulse generation is made by limit contacts operated by the carriage at the end of each stroke, connected to wires 327 and 329. These wires also control through appropriate gates and associated circuit the transfer of characters from storage 302 from the top (first character of line) or the bottom (last character of line). The value shown in counter 326 is continuously compared to the flash value of the particular character in register 318 at this time. When these values are equal, a pulse is generated by comparison circuit 320 over wire 331 to energize decoder 322 and flash the flash lamp associated with the character presently in the register via wires 333 connecting the decoding circuit to the flash lamps unit 324. In response to the flash, wire 335 is energized to reset register 318 and thus cancel the identity and flash value of the character which has just been flashed from register 318. If no flash occurs, for reasons explained below, the character and its flash value is stored back into line storage 302.

As stated above, the tape fed to reader 156 (FIG. 10) is an eight-level tape provided with font shift codes. Seven levels are used for character identity and there are seven corresponding bits in each word of storage 182. However, as shown in FIG. 10 (in the right hand section of storage 182), each "identity" word in storage contains 10 bits. The three extra bits, when used in combinations, at the exclusion of other bits, represent eight font shift codes. Each time input decoder 157 identifies a shift code, one (or several) wire of group 155 is energized to cause the proper arrangement of shift bits to be added to each and every character code following, until a new font shift code is recognized by the decoder and sent to the storage. Thus, in storage 182 of FIG. 10 and 302 of FIG. 11, the identity code of each character is complemented by a font code to distinguish between characters of the same identity but of different fonts.

Referring back to FIG. 11, whenever a character identity is decoded by decoder 322, the font to which it belongs is also detected and sent over wires 316. In the example shown in FIG. 11, it is assumed that no more than three fonts are used but this figure is of course not a limitation.

The operation of the font shifting circuit will be explained in relation to the example shown in FIG. 12. The lower part of this figure represents a line to be composed, as it appears in the tape. The first word, in "Roman, 10-point" is represented by a block of 7-level perforations. As the second word must be "14-point Bold," it is preceded by a shift code SH3. The third word being again "10-point, Roman" is preceded by the appropriate shift code SH–1. The fourth word which has to be "12-point Italics" is preceded by shift code SH–2, finally, as the last words of the line are "10-point Roman" they are preceded by shift code SH–1. In the storage, this line will appear as shown in the upper part of FIG. 12, exclusive of flash values. Bit 10 of the storage will be energized (in the "one" position) for each character of the first, third, fifth and sixth word, bit 8 for the second word and bit 9 for the fourth word. Let us now assume that the matrix is in the "Roman" or "one" position at the beginning of the transcription of the line. The first word is going to be transcribed letter by letter as explained above, because, in this case, contact 347 of "font 1" of matrix shift mechanism 336 is closed and flip-flop 352 is in the "one" position (wire "font 1" from decoder energized) "and" gate 350 is open energizing "flash permissible" wire 342. As soon as decoder 322 reads the first letter of the second word which has to be in 14-pt. Bold, the associated "font code" represented by the energization of bit 8 is also recognized by the decoder and a signal appears on wire 305.

This signal through wire F3 and flip-flop 352 closes gate 350 removing thus the "permission to flash" and through flip-flops 354 and 356, stage 0, instructs the machine not to flash (energization of wire 340). Each character of the second word is returned to storage. Permission to flash is re-established with the first character of the third word which calls for the same font as the first. Permission to flash is again denied for the fourth word which causes energization of wire 303 to lock the flash circuit, and re-established for the last words of the line. In conclusion, at the end of the first sweep, all the "10-point Roman" characters have been flashed and removed from storage. Blanks in the line would appear if the film were developed at this time at the locations of the second and fourth words. It may be pointed out here that, although these words have been omitted, the exact space they require has been left between the projected words.

When the first font identity code is read, with the first character of the line, it is transferred to comparison circuit 366 which continuously compares the font codes associated with each character to the actual matrix position represented by contacts connected through wires 370 to said comparison circuit. As long as this comparison circuit detects identity, the decoded font codes have no effect on the circuit. As soon as a new shift code enters the comparison circuit, a lack of identity is recognized and the shift code is stored in font shift code storage 372. Thus, in the example of FIG. 12, the "bit 9" (font 2) shift code is entered into storage 372 at the time the first character of the second word is read. The code in storage 372 is continuously compared to the present matrix position in comparison circuit 374.

As long as there is no identity, that is between the moment a shift code is entered into storage and the moment the matrix has been shifted to the position called for by said code, wire 375 is energized which shifts flip-flop 376 to the "one" position and thus energizes wire 380 inhibiting gate 362. Said gate 362 opens as soon as wire 378 is energized at the end of the sweep of the reciprocating carriage. This gate, when opened, energizes wire 382 to prevent further transcription by locking gate 314. The appearance of a shift code at the output of comparison circuit 366 has turned flip-flop 360 to the "one" position through wire 365. Energization of "end of sweep" wire 378 causes flip-flop 360 to return to zero, but not before gate 364 has opened through the combined action of wires 367 and 378. To this effect, a delay 358 is placed in the circuit, as shown. Gate 364 sends now, at the end of the sweep, a read command to storage 372 which, through comparison circuit 374 and wire 475 causes the matrix to shift to the new position, as demanded by the code shift stored in 372. As soon as this mechanical re-positioning of the matrix is accomplished, the new matrix position code appears on wire 472, comparison circuit 374 detects identity, and releases flip-flop 376 allowing transcription to proceed for the next full sweep of the reciprocating carriage. As explained above, at the end of the first transcription sweep of a line requiring font shifts, all the character codes belonging to a font not in position at the time of the first sweep are returned into storage 302. As long as there are characters in this storage gate 387 is biased via wire 393 to prevent the transfer of a new line from storage 184 (FIG. 10) via wire 389.

In the example of FIG. 12, the second active sweep of the reciprocating carriage will start after the matrix has moved to font 3 as the corresponding shift code SH3 has been stored in 372 during the first active sweep. This second sweep will proceed in the same way as the first so that, at the end of said second sweep the second word "14 pt. Bold" has been projected to the film and code SH2 has been stored in storage 372. Transcription is now stopped, as explained above, while the reciprocating carriage completes one or more inactive sweeps, until the matrix is in the new position, as demanded by code SH2. Transcription is renewed as soon as the new position has been reached by the matrix and the carriage has reached the end of a sweep. A third active sweep now takes place to project the fourth word of the line, to complete the transcription of said line. At the end of this last sweep, gate 389 is opened to allow storage 302 to receive the character codes of the next line, and gate 397 also opens to allow the line spacing or leading, controlled by wire 399, to take place. Thus, is the system described, each line requiring matrix shifts can be completely transcribed without stopping the reciprocating carriage, in as many active sweeps of said carriage as there are different fonts in said line.

If lines containing no C.R. or other "end of line" codes or discretionary hyphen codes have to be transcribed from the punched tape, the following procedure can be used. As the line is read by tape reader 156 (FIG. 10) the codes are transferred by wires 160 to a shift register 386 (FIG. 13) which may also include a decoder. The purpose of this arrangement is to display at all times, during the loading operation, a certain number of the last characters transferred to storage.

This number, in the example of FIG. 13, equals 15. Any commercially available character display system can be used, for display block 388 controlled by the shift register. As soon as accumulator 180 (FIG. 10) reaches full capacity, meaning that the line is full, a signal appears on wire 258. This signal stops the tape reader and signals the operator that a line has been loaded which cannot be jusitified. At this point, a portion of the last word appears in display block 388 (FIG. 13). In the example shown, the last word is "CONVENIENTLY" but only "CONVENIENTL" appears because the storage of the width of character "L" has been enough to fill accumulator 180 or overfill it (in both cases, wire 258 is activated). A bank of relatively wide and light contact keys similar to piano keys is located at 390, adjacent to display units 388. There is one key associated with each displayed character, and each time a key is depressed, the input tape moves back one step. Additional button HYP causes a hyphen code to be entered into the tape reader 156 and button CR enters a carriage return code, signalling that the line can be processed. In order to shorten the overset line given as an example, the operator, after he decides to introduce a hyphen between letters "N" and "I," moves his finger along path 396 depressing successively at fast rate, five keys of bank 388, thus backing up the tape 152 five steps, the hyphen key to introduce a hyphen, and the CR key to signal the machine to proceed and start the justification computation. The tape reader, of course, should be di-directional. When the tape is moving forward (in the normal loading direction) characters are stored and their widths accumulated as explained above. When the tape is stepped back, the "erased" characters have to be pulled out of storage and their width subtracted from the accumulated width by means not shown but which are well known to the man of the art. In the case where the operator decides to correct an overset line by going back to the last justifying space the HYP button is made ineffective by the recognition, by the circuit, of a justifying space as the first character removed from storage. In this case, in the example shown, the operator's finger would follow path 398 to the end of the key banks.

The number of characters read by tape reader 156, for each line, is detected by a sprocket counter and stored at 158. This counter can be used to control the tape reverse operation so that, by punching the appropriate button, the tape can be automatically moved back by the same number of steps it has moved forward from the beginning of a new line.

Figure 16:
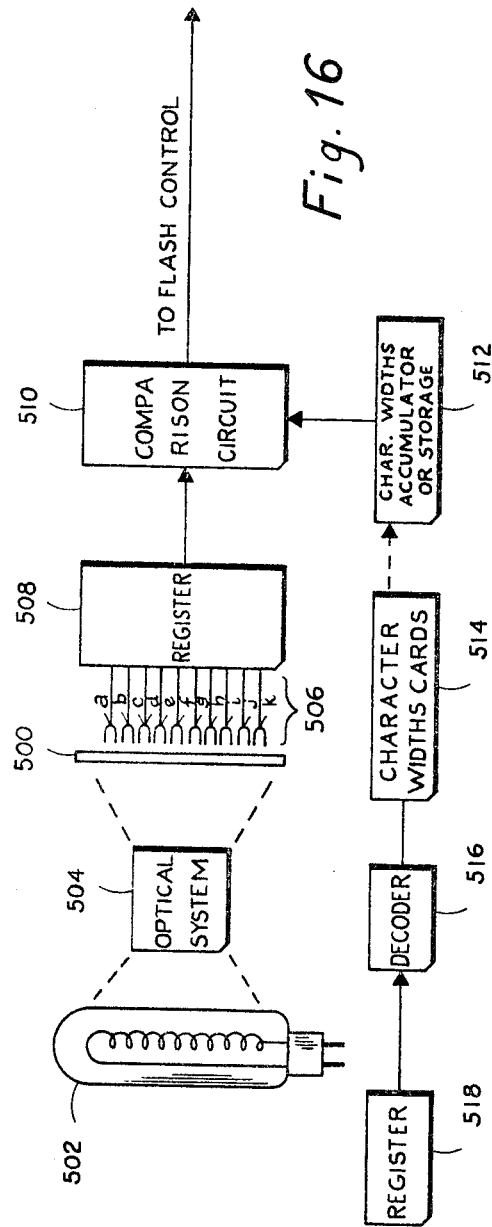
FIG. 16 is a block diagram of an alternative embodying the grid of FIG. 15.

FIGS. 15 and 16 represent alternate means to measure the displacement or represent the position of the reciprocating carriage. In this particular variation, the slits-grid 70 (FIGS. 3 and 5) is replaced by a grid 500 (FIG. 15) provided with transparent slots 501. There is one line of slots per binary number representing in binary form the position of the carriage from a zero position. In the case of the figure, ten lines are shown corresponding to values 1, 2, 4, 8 . . . 256 and 512 which make it possible to "measure" the displacement of the carriage from zero to 1023 units. These units are preferably "relative units," for example, width units based on one eighteenth of a typographical "EM" of a given size. A fixed exciter lamp 502 and optical system 504 project, on the surface of grid 500 a thin luminous slit. Slots 401 let a portion of said luminous slit pass through and hit corresponding photocells 506. There are as many photocells as there are lines of slots on the grid, that is ten in the case of the figure. Each photocell represents the binary value of its associated line of slots. Thus, the actual position of grid 500 is represented by the energized photocells of bank 506. If, for example, the carriage has moved 118 steps from its zero position, line 503 (FIG. 500) will register with the luminous slit projected on grid 500 (FIG. 16) and photocells 506*b*, *c*, *e*, *f* and *g* will be energized by light admitted through slots 503*b*, *c*, *e*, *f* and *g*. These represent binary values 2, 4, 16, 32 and 64 which correspond to a total of 118 units. The energized photocells actuate a circuit 508 which in turn is connected to a comparison circuit 510. This comparison circuit can be the same as or similar to the comparison circuit 320 of FIG. 11. This circuit compares, at all times the photocell bank 506 output with the accumulated flash time values of storage 512 similar to storage 302 of FIG. 11. FIG. 16 represents schematically how this storage is connected to register or tape 518 through decoder 516 and widths cards units 514, disregarding justification computation.

The image director, one of the objects of the present invention, can be incorporated in various systems within the scope of said invention. It is for example possible to use said image director or equivalents as image formation devices in systems where cathode ray tubes or similar components are included to display one or several lines of characters on a screen. Some of the obvious advantages of such combinations reside in lower cost image formation means as compared to so called "electronic character generators," higher image quality than can be obtained with such devices and higher speeds than can be obtained in the embodiments described above.

Figure 14:
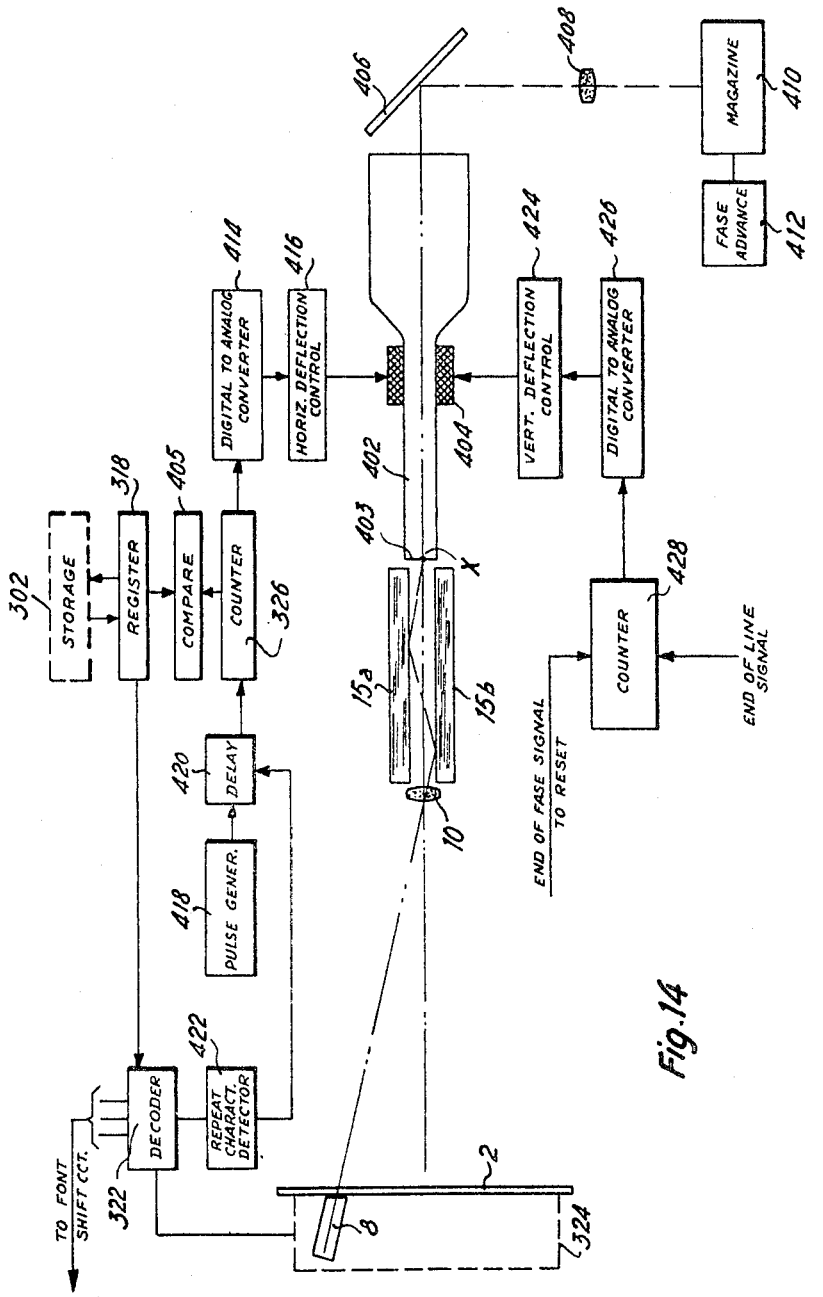
FIG. 14 represents diagrammatically an embodiment of the present invention including a cathode ray tube for line formation.

Such an arrangement is diagrammatically shown in FIG. 14. A cathode ray tube 402 is positioned in series with the image director so that its photosensitive cathode 403 is in the image plane of the image director. The latter is preferably of the type described in relation with FIG. 2. Some components, are shown in FIG. 14 such as flash unit 8, matrix 2, one of the stationary lenses 10, and the reflecting mirrors 15*a* and 15*6*.

The operation of the machine is similar to what has been described in relation with FIGS. 10 and 11 and only a few similar components, such as storage 302, register 318, decoder 322, flash assembly 324 and counter 326 are shown. A pulse generator 418 continually emits pulses at proper intervals to operate counter 326. These pulses fulfill the same function as the grid generated pulses of previous arrangements. They are fed to a counter 326 which is continuously compared to the flash value of the next character to flash in comparison circuit 405. When counter 326 reaches the same count as the flash value of the character is register 318 a lamp is flashed as explained above. Counter 326 is connected to a digital-to-analog converter 414 which controls the horizontal or character spacing deflection of the horizontal section of yoke 404 of the cathode ray tube 402. As there is no reciprocating mechanical component in this arrangement, higher speeds can be achieved. The total current used for horizontal deflection is, proportional to the count. Counter 326 is reset to zero by the end of line signal. As soon as the image of a character is formed at X on the photocathode, the latter emits a stream of electrons which are focused and deflected to the desired location on the face of the cathode ray tube by its deflection yokes. Line spacing may be obtained by operating the vertical deflection control 424 by a counter 428 through a digital-to-analog converter 426. Counter 428 may receive one or more pulses at the end of each line for proper leading. Said counter can be reset to zero by an end of page signal which triggers page advance mechanism 412 controlling film magazine 410. Images of characters, lines and pages are formed on the film contained in said magazine by a mirror 406 and a lens 408.

In order to minimize the speed limitations introduced by the recovery time of the flash lamps a detector circuit 422 can be used to activate a delay 420. The purpose of this arrangement is to slow down the rate of projections when the same character must be flashed repetitively. An average rate of 4,000 characters per second is possible. The ratio can be reduced down to 2,000 for repeat characters through said delaying circuit.

Other illumination means such as cathode ray tubes can be used rather than flash lamps. Images of microfilm size can also be produced by proper optics.

The images of characters can also be formed on the face of an iconoscope and closed loop television techniques utilized to form lines or pages on the face of a second cathode ray tube.

It is to be understood that the invention is not limited to the embodiments herein described and that changes may be made therein without departing from the scope of the invention.

Having thus described the invention, we claim:

1. In a photographic type composing machine, a method for projecting to a common character image position all the characters of a matrix on which said characters are arranged in rows and columns formation comprising a first step in which all the columns of characters are merged into one column and a second step of continuously sweeping the length of a line to be composed and a third step in which all the rows of characters are merged into one row.

2. Photographic type composing machine including a fixed matrix provided with characters arranged in rows and columns and an optical system adapted to make an image of any character at a common image position in which the optical system and the sensitized surface are continuously moving one in relation to the other during the composition of a line, characterized in that:

The optical system includes a lens for each column of the matrix, producing images of all the characters of said column on a line common to all columns and a pair of parallel reflecting surfaces positioned between said lenses and said film to reduce the number of images produced by each column to one image on the film and in that an electronic storage is used to store codes representing at least a full line of characters, said codes including the identity of said characters and their location in said line with means to read said storage and comparison means associated to the relative displacement of the optical system and the film, and in that flash illumination means are provided, one per character of the matrix, said illumination means being controlled by said storage and by the comparison means associated with the displacement means so that a full line is composed during each cycle of the machine.

3. Photographic type composing machine according to claim 2, in which the film is stationary and the lenses associated to the columns of characters of the matrix are continuously moving between the matrix and a pair of fixed parallel reflecting surfaces.

4. Photographic type composing machine according to claim 2 in which the film is stationary and the lenses associated with the columns of characters of the matrix are continuously reciprocating between said matrix and a pair of fixed parallel reflecting surfaces, and in which a line of characters is composed during each reciprocation of the lenses.

5. Photographic type composing machine according to claim 2 in which the film is stationary and the lenses associated with the columns of characters of the matrix are continuously reciprocating between said matrix and a pair of fixed parallel reflecting surfaces, characterized in that an aperture is provided in a shutter moving in the vicinity of the film in synchronism with the lenses motion to prevent parasitic images of character to be projected onto said film, so that only the image produced by the lens associated with the column containing the selected character reaches the film surface.

6. Photographic type composing machine according to claim 2 in which the film is stationary and the lenses associated with the columns of characters of the matrix are continuously reciprocating between said matrix and a pair of fixed parallel reflecting surfaces, and in which the moving lenses operate a pulse generator to indicate at any time their position and consequently the position of the potential images they form on the film.

7. Photographic type composing machine according to claim 2, in which photoelectric means are provided to generate a signal in the case where a selected character has not been projected because of a faulty operation of the machine and a signal in case where one of the illumination means operates by error, said safety signal being produced by comparing the command signals directed to the illumination means to the signals produced by said photocell.

8. Photographic type composing machine according to claim 2 in which there are in the matrix a plurality of characters, belonging to different groups with one illumination means for each group and in which the selection of the appropriate group is made by moving the matrix so that one or the other of said groups of characters is positioned in front of the illumination means, said displacement being carried out between the projection of succeeding lines, and in which in the case where a line includes a word to be composed of characters which belong to a group which is not the group aligned with the illumination means, a signal is generated by a storage to prevent the operation of said illumination means during the time when said lenses would normally project said word leaving on the film a blank space corresponding to the width of said word and in which the film displacement for line spacing is disabled so that the missing word can be projected in a succeeding cycle of the machine after the matrix has been shifted to a new position to produce on the film the missing word.

9. Photographic type composing machine according to claim 2, characterized in that an optical system makes an image of any character of the matrix at a fixed common image position, said image position being located on the photocathode of a cathode ray tube.

10. In a photographic type composing machine an image director unit comprising a matrix of master characters arranged in columns and rows, means for illuminating master characters individually, a lens mount, a lens for every column on the matrix mounted in said lens mount effective to merge the images of all columns on the matrix into one column, a pair of reflecting surfaces effective to merge the images of all rows on the matrix into one row and a means to cause relative reciprocation between the lens mount and the reflecting surfaces.

References Cited by the Examiner
UNITED STATES PATENTS

| | | | |
|---|---|---|---|
| 791,062 | 5/1905 | Wetmore | 96—46 |
| 2,725,786 | 12/1955 | McCarthy | 95—4.5 X |
| 2,808,768 | 10/1957 | Squassoni | 95—4.5 |
| 2,865,270 | 12/1958 | Higonnet | 95—4.5 |
| 2,887,935 | 5/1959 | Scott | 95—4.5 |
| 2,900,884 | 8/1959 | Coleman | 95—4.5 |
| 2,942,538 | 6/1960 | Bechtold | 95—4.5 |
| 3,044,374 | 7/1962 | Friedman | 95—4.5 |

JOHN M. HORAN, *Primary Examiner.*